United States Patent [19]
Shimizu et al.

[11] Patent Number: 5,106,271
[45] Date of Patent: Apr. 21, 1992

[54] SLANT PLATE TYPE COMPRESSOR

[75] Inventors: Shigemi Shimizu, Sakai; Kazuhiko Takai, Isesaki, both of Japan

[73] Assignee: Sanden Corporation, Gunma, Japan

[21] Appl. No.: 705,056

[22] Filed: May 23, 1991

Related U.S. Application Data

[62] Division of Ser. No. 424,691, Oct. 20, 1989, Pat. No. 5,062,772.

[30] Foreign Application Priority Data

Oct. 25, 1988 [JP] Japan ............................ 63-138136[U]
Oct. 25, 1988 [GB] United Kingdom ............ 138134[U]

[51] Int. Cl.$^5$ ................................................ F04B 1/12
[52] U.S. Cl. ................................. 417/269; 417/222 S; 74/60
[58] Field of Search ................... 417/269, 271, 222 S, 417/222 R; 92/71, 12.2; 74/60

[56] References Cited

U.S. PATENT DOCUMENTS

| | | |
|---|---|---|
| 2,182,740 | 12/1939 | Wrigley . |
| 2,776,627 | 1/1957 | Keel .................... 74/60 |
| 3,183,848 | 5/1965 | Raymond .................. 74/60 |
| 3,246,577 | 4/1966 | MacIntosh .................. 74/60 |
| 4,008,005 | 2/1977 | Hiraga . |
| 4,073,603 | 2/1978 | Abendschein et al. . |
| 4,125,298 | 11/1978 | Heurich et al. . |
| 4,294,139 | 10/1981 | Bex et al. . |
| 4,301,716 | 11/1981 | Saegusa et al. . |
| 4,574,448 | 3/1986 | Brandenstein et al. . |
| 4,771,676 | 9/1990 | Matsumoto et al. . |
| 4,820,132 | 4/1989 | Higashihara et al. . |
| 4,842,488 | 6/1989 | Terauchi . |
| 4,869,651 | 9/1989 | Shimizu et al. . |
| 4,893,994 | 1/1990 | Copp ...................... 417/269 |
| 4,913,626 | 3/1990 | Terauchi ................. 417/222 S |
| 4,946,350 | 8/1990 | Suzuki et al. . |

FOREIGN PATENT DOCUMENTS

| | | |
|---|---|---|
| 2415206 | 10/1974 | Fed. Rep. of Germany . |
| 2609970 | 9/1976 | Fed. Rep. of Germany ...... 417/269 |
| 0053410 | 1/1978 | Japan .................... 417/269 |
| 54-108009 | 8/1979 | Japan .................... 417/269 |
| 29678 | 1/1989 | Japan . |
| 1-142276 | 6/1989 | Japan . |

Primary Examiner—Richard A. Bertsch
Assistant Examiner—Michael I. Kocharou
Attorney, Agent, or Firm—Banner, Birch, McKie & Beckett

[57] ABSTRACT

A slant plate type compressor including a compressor housing having a cylinder block is disclosed. A plurality of peripherally located cylinders are formed through the cylinder block. A piston is slidably fitted in each of the cylinders and is reciprocated by a drive mechanism which includes a slant plate. The slant plate includes a boss for mounting a balance weight ring thereon. The balance weight ring includes an annular depression formed at an inner peripheral portion thereof. The balance weight ring is firmly attached to the boss by different types of retaining means.

5 Claims, 13 Drawing Sheets

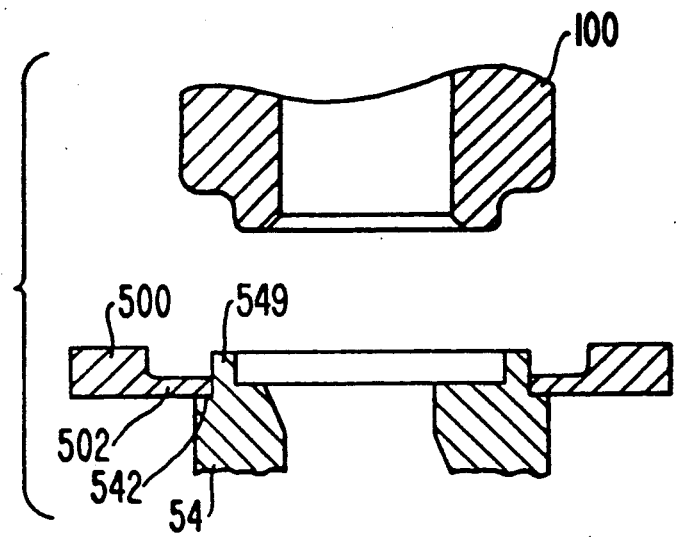
FIG. 6(a)
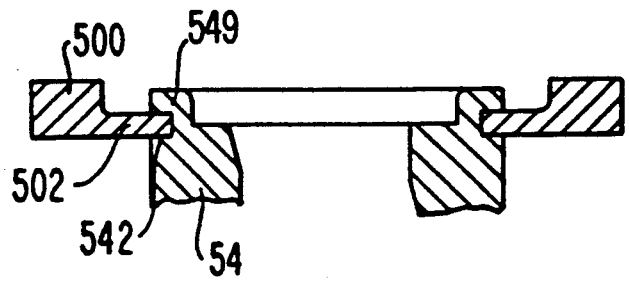
FIG. 6(b)

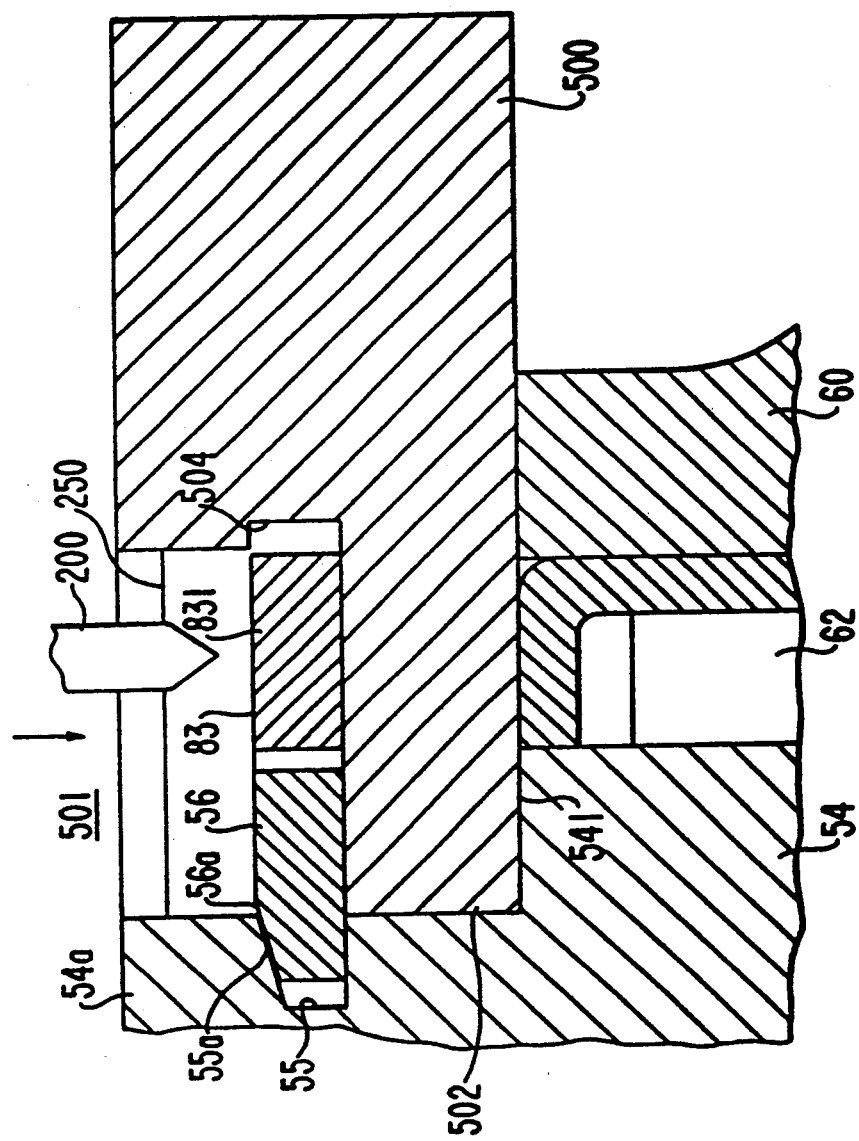

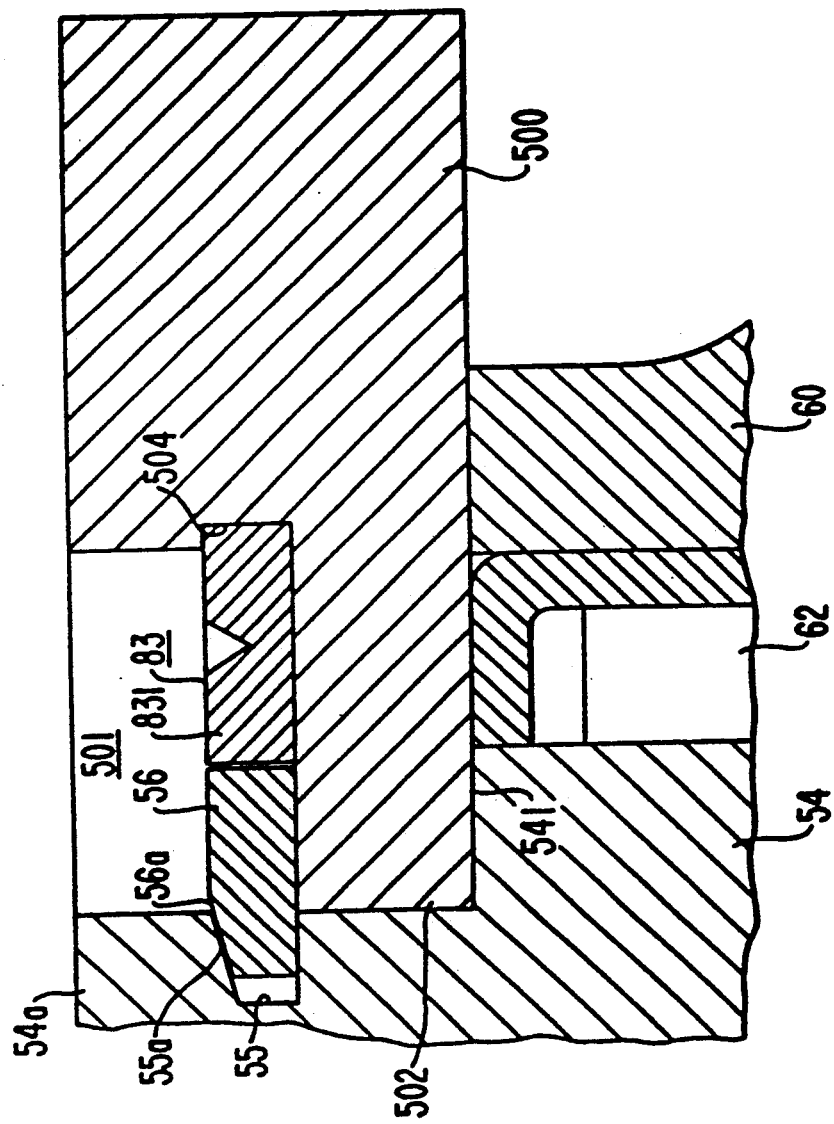

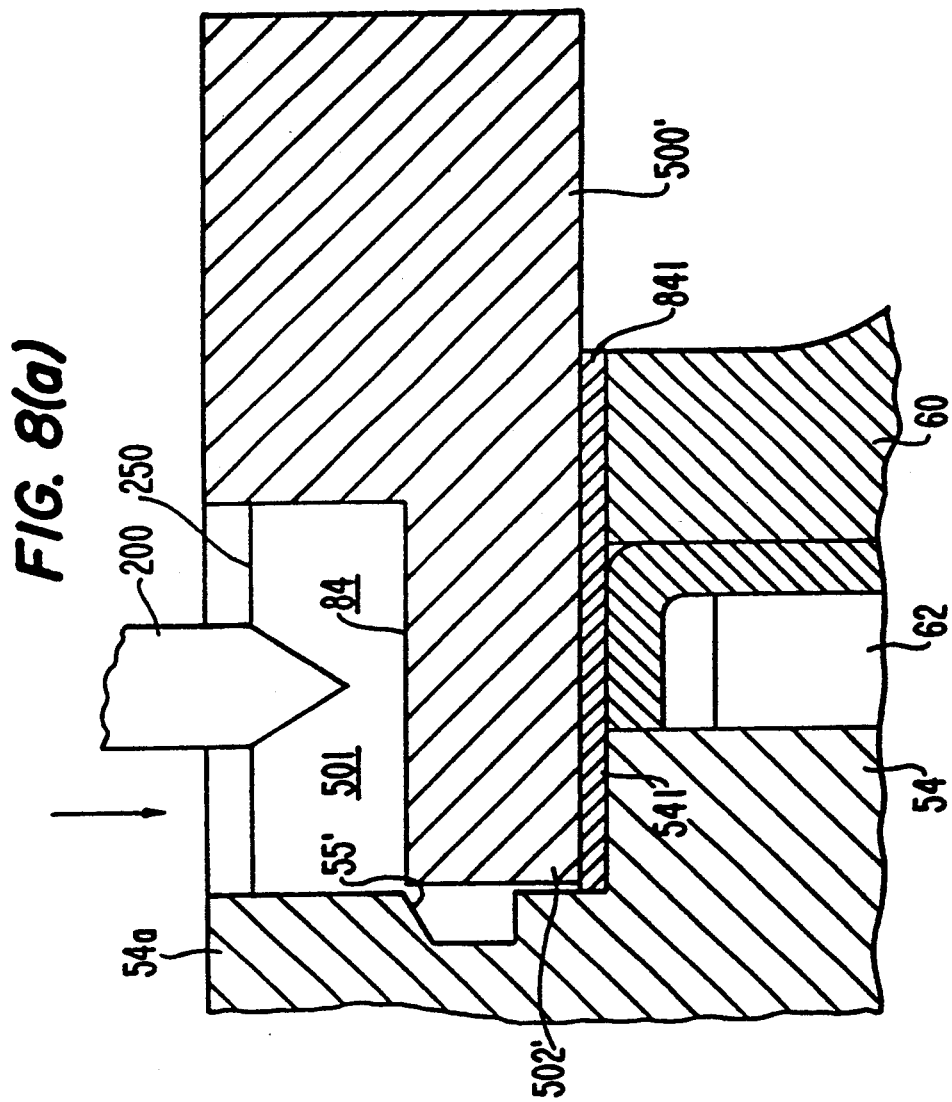

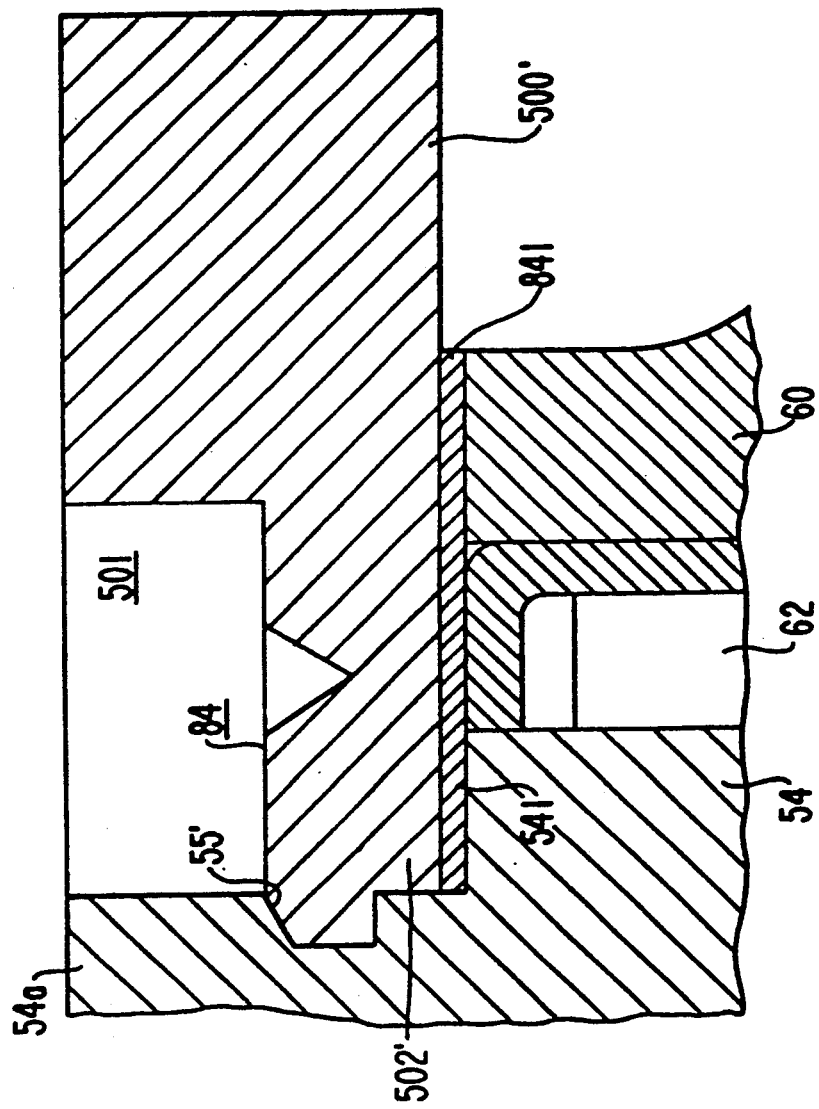

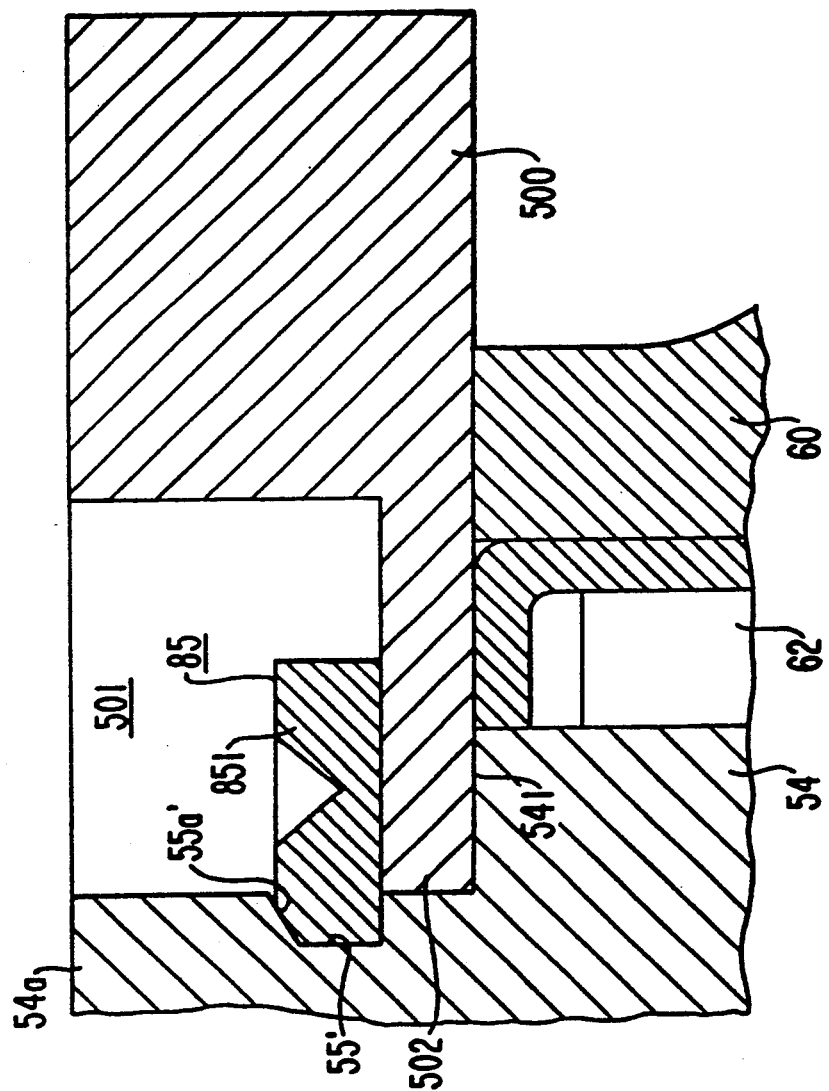

SLANT PLATE TYPE COMPRESSOR

This application is a division of application Ser. No. 07/424,691, filed Oct. 20, 1989 now U.S. Pat. No. 5,062,772.

BACKGROUND OF THE INVENTION

1. Technical Field

The present invention relates to a refrigerant compressor, and more particularly, to a slant plate type compressor, such as a wobble plate type compressor for use in an automotive air conditioning system.

2. Description of the Prior Art

As disclosed in U.S. Pat. No. 4,073,603, and Japanese Patent Application Publication No. 64-29,678, a slant plate type compressor includes a balance weight ring of substantial mass disposed on the nose of the hub or "boss" of the slant plate, in order to balance the slant plate under dynamic operating conditions. The balance weight ring is held in place by means of a retaining ring.

FIGS. 1 and 2 show a slant plate type compressor as disclosed in the Japanese application. Boss 54 of slant plate 50 includes smaller diameter portion 54a at an axially rearward end (to the right in FIG. 1 and to the top in FIG. 2) thereof, resulting in the formation of annular shoulder 541 forward of portion 54a. Annular balance weight ring 500 is mounted about smaller diameter portion 54a, in contact with shoulder 541. Balance weight ring 500 includes annular depression 501 formed at an inner periphery of the axially rearward surface, reducing the thickness of ring 500 at the inner periphery. Relatively thin plate portion 502 remains at the inner periphery of balance weight ring 500, forward of depression 501.

With further reference to FIG. 2 annular groove 55 is formed in the radially outer peripheral surface of smaller diameter portion 54a, and annular snap ring 56 is disposed therein. Snap ring 56 includes annular tapered surface 56a formed at a radially inner portion of the axially rearward surface. Rearward annular wall 55a of annular groove 55 slants inwardly (to the left in FIG. 2) at an angle generally corresponding to the angle of annular tapered surface 56a of snap ring 56 such that snap ring 56 may be slidably fitted and retained within groove 55. The radially outer portion of snap ring 56 extends exteriorly of groove 55 and contacts thin-plate portion 502 of balance weight ring 500. Thin plate portion 502 of balance weight ring 500 is retained between snap ring 56 and annular shoulder 541. Therefore, balance weight ring 500 is retained on boss 54.

However, when the compressor operates under unusual or extreme conditions, for example, when the rotational speed of the compressor is extremely high, when the rotational speed of the compressor is suddenly increased, or when refrigerant in the liquid state is present in the compressor, an extremely large force is produced which tends to cause snap ring 56 to expand in the radially outer direction. As a result, snap ring 56 may slip out of groove 55, and out of contact with balance weight ring 500. Without the retaining contact of snap ring 56, balance weight ring 500 will slip off of boss 54 and damage the internal elements of the compressor.

SUMMARY OF THE INVENTION

A slant plate type compressor in accordance with the present invention includes a compressor housing having a cylinder block. The cylinder block includes a plurality of peripherally disposed cylinders. A crank chamber is enclosed within the cylinder block, forward of the location of the cylinders. The compressor housing includes a suction chamber and a discharge chamber formed therein. A piston is slidably fitted within each of the cylinders, and a drive mechanism is coupled to the pistons to reciprocate the pistons within the cylinders. The drive mechanism includes a drive shaft rotatably supported in the housing, and coupling means including a slant plate mounted about the drive shaft. The coupling means converts rotational motion of the drive shaft into reciprocating motion of the pistons in the cylinders. The slant plate is disposed at an angle to the drive shaft.

The compressor further includes an annular balance weight ring disposed on the slant plate to balance the slant plate under dynamic operating conditions, and a retaining means to retain the balance weight on the slant plate. In a first embodiment, the balance weight ring is secured to a boss of the slant plate by an annular member firmly disposed in an annular groove formed in the boss so as to retain the balance weight on the boss. A second annular member is disposed about the first annular member to retain it in the groove. In a second embodiment, the boss includes axial projections which are bent around the inner periphery of the balance weight to secure it to the boss. In a third embodiment, the radially inner peripheral surface of the balance weight is secured to an annular groove formed in the slant plate. In a fourth embodiment, an annular member secures the balance weight to the slant plate. The annular member is caulked to an annular groove formed in a boss of the slant plate. In a fifth embodiment, the balance weight is secured to the slant plate by a plurality of fasteners.

Each embodiment of the present invention provides the advantage that the balance weight is securely retained on the slant plate when the compressor operates at unusual or extreme operating conditions. Further advantages, features and other aspects of this invention will be understood from the detailed description of the preferred embodiments with reference to the drawings.

BRIEF DESCRIPTION OF THE DRAWINGS

FIGS. 6(a) and 6(b), respectively, show an enlarged partial sectional view before and after formation of the retaining mechanism as shown in FIG. 5.

FIGS. 7(a) and 7(b), respectively, show an enlarged partial sectional view before and after formation of a retaining mechanism for a slant plate type refrigerant compressor in accordance with a third embodiment of the present invention.

FIGS. 8(a) and 8(b), respectively, show an enlarged partial sectional view before and after formation of a retaining mechanism for a slant plate type refrigerant compressor in accordance with a fourth embodiment of the present invention.

FIGS. 9(a) and 9(b), respectively, show an enlarged partial sectional view before and after formation of a retaining mechanism for a slant plate type refrigerant compressor in accordance with a fifth embodiment of the present invention.

DETAILED DESCRIPTION OF THE PREFERRED EMBODIMENTS

Figure 1:
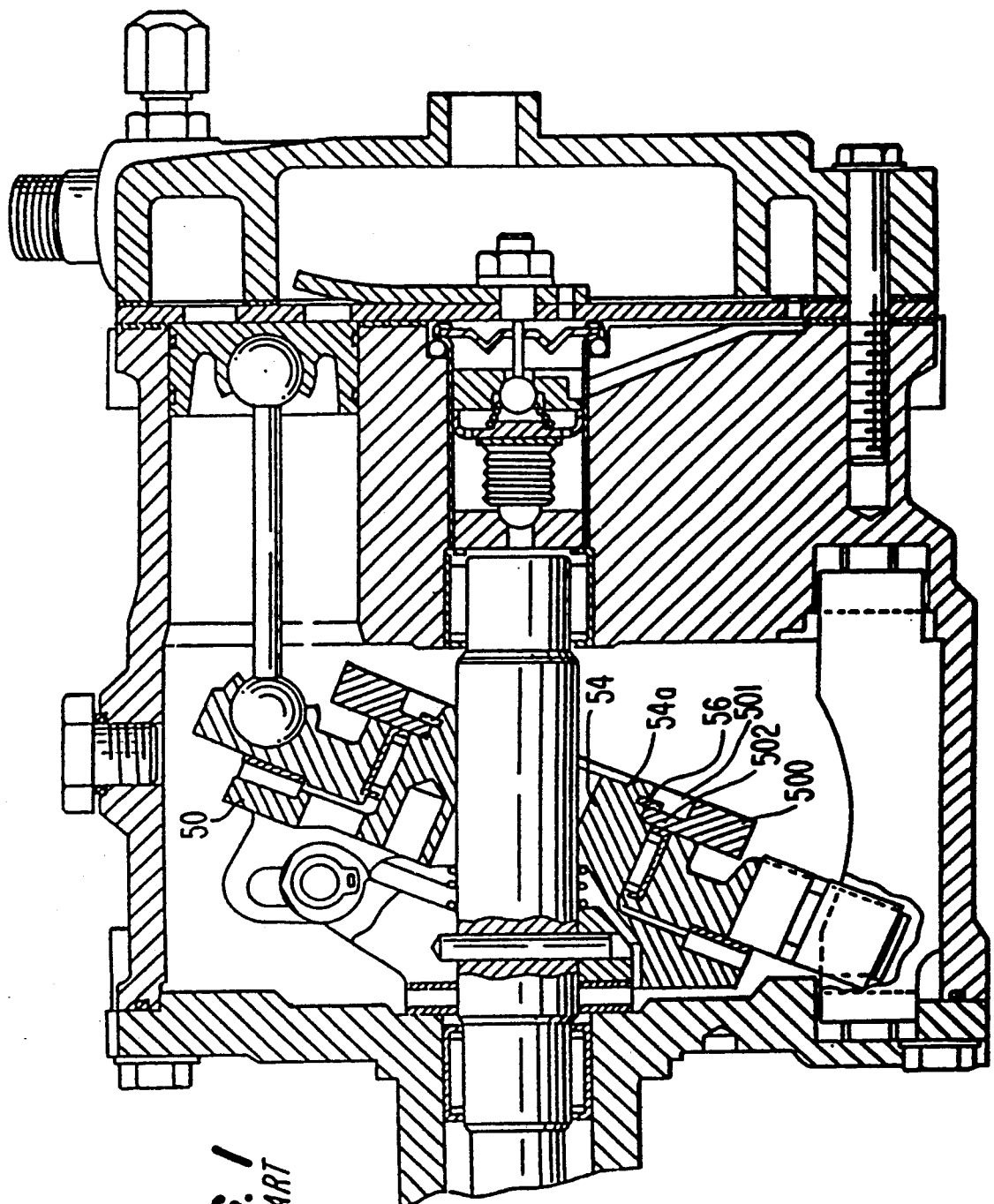
FIG. 1 shows a vertical longitudinal sectional view of a slant plate type refrigerant compressor in accordance with the prior art.
Figure 2:
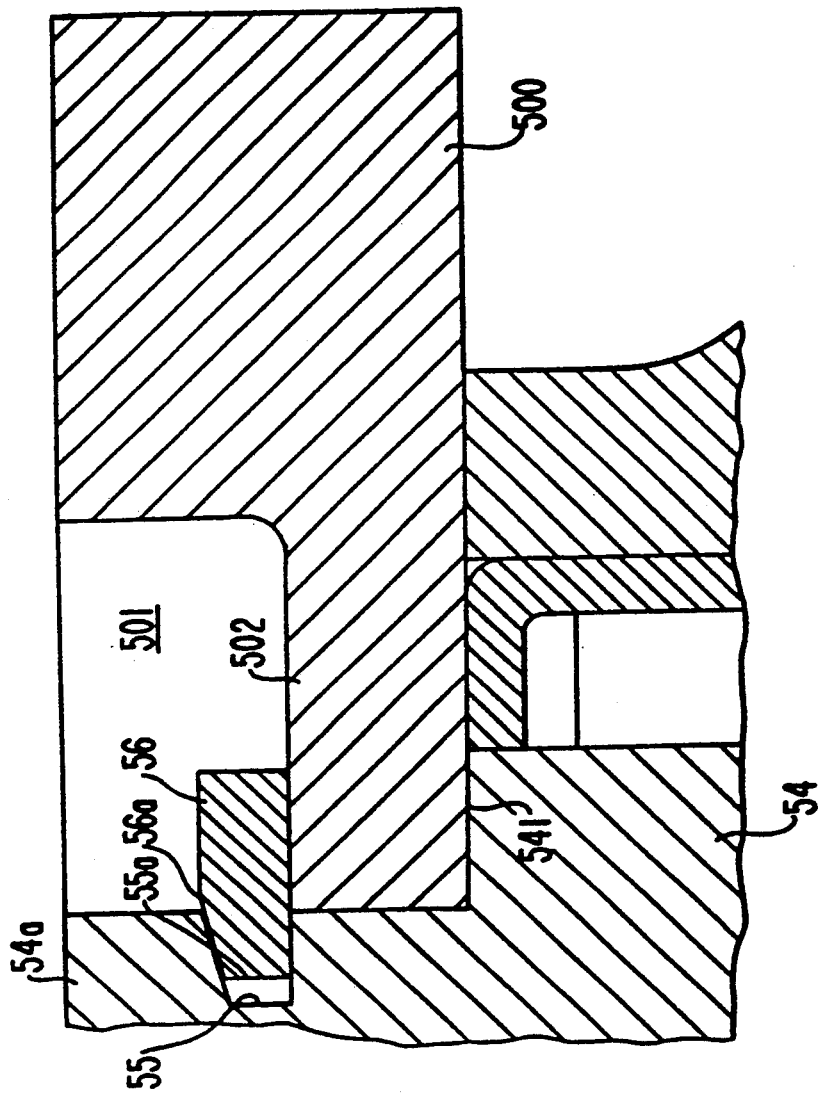
FIG. 2 shows an enlarged partial sectional view of the compressor shown in FIG. 1 including the balance weight ring and retaining mechanism.

In all of FIGS. 3-10, identical reference numerals are used to denote elements which are identical to the similarly numbered elements shown in prior art FIGS. 1 and 2. Additionally, although compressor 10 is shown and is described with respect to FIGS. 3-10 as a wobble plate type compressor, the invention is not limited thereto and is applicable to any type of slant plate type compressor, including both fixed and variable capacity compressors of the wobble or swash plate type. Furthermore, in the following description, the left side of FIGS. 3, 5 and 10 will be referred to as the front or forward side and the right side will be referred to as the rear side. The remaining Figures show views shifted by approximately 90°. The term "axial" refers to a direction parallel to the longitudinal axis of the drive shaft, and the term "radial" refers to the perpendicular direction. Of course all of the reference directions are made for the sake of convenience of description and are not intended to limit the invention in any way.

Figure 3:
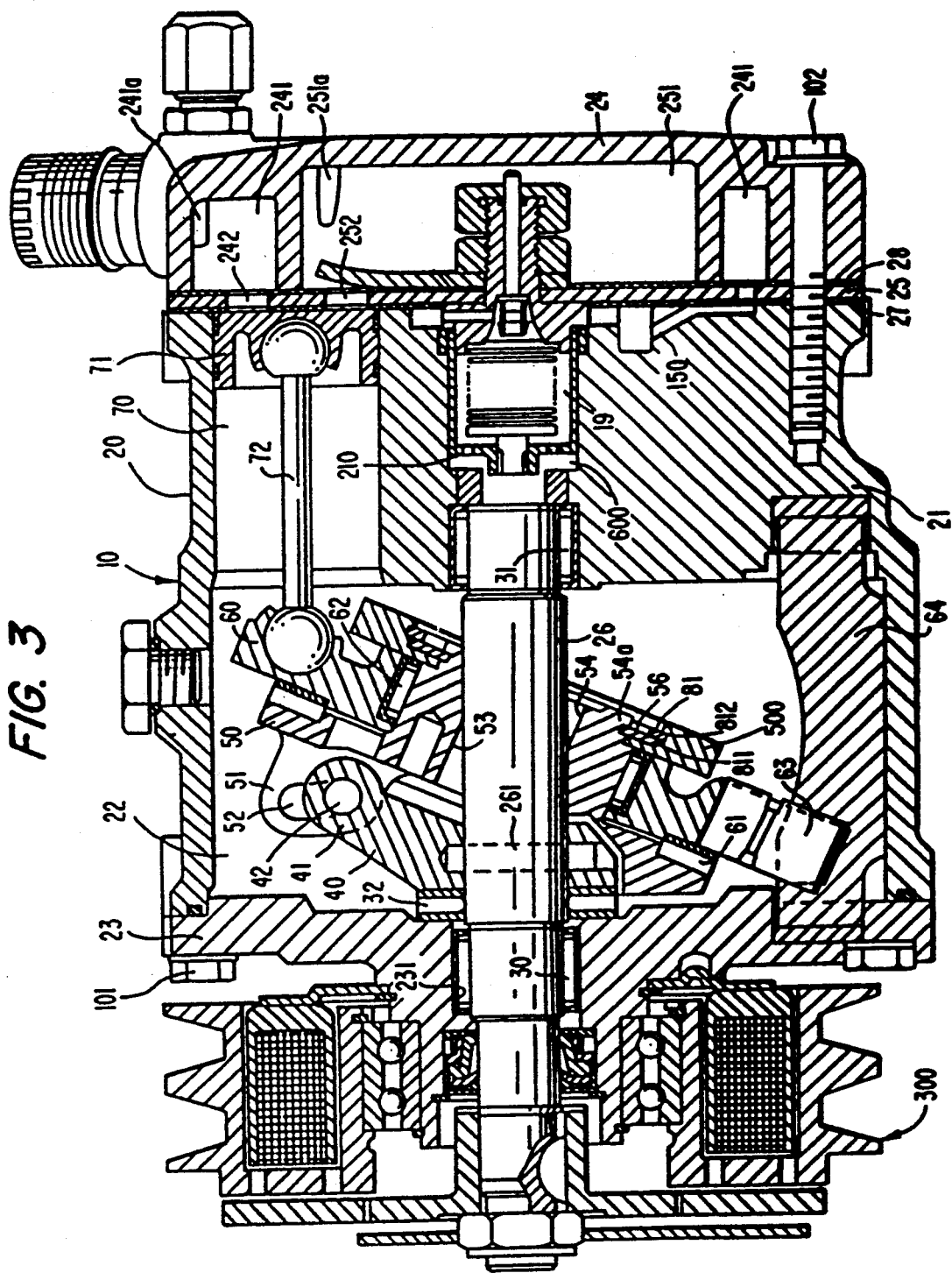
FIG. 3 shows a vertical longitudinal sectional view of a slant plate type refrigerant compressor in accordance with a first embodiment of the present invention.
Figure 4:
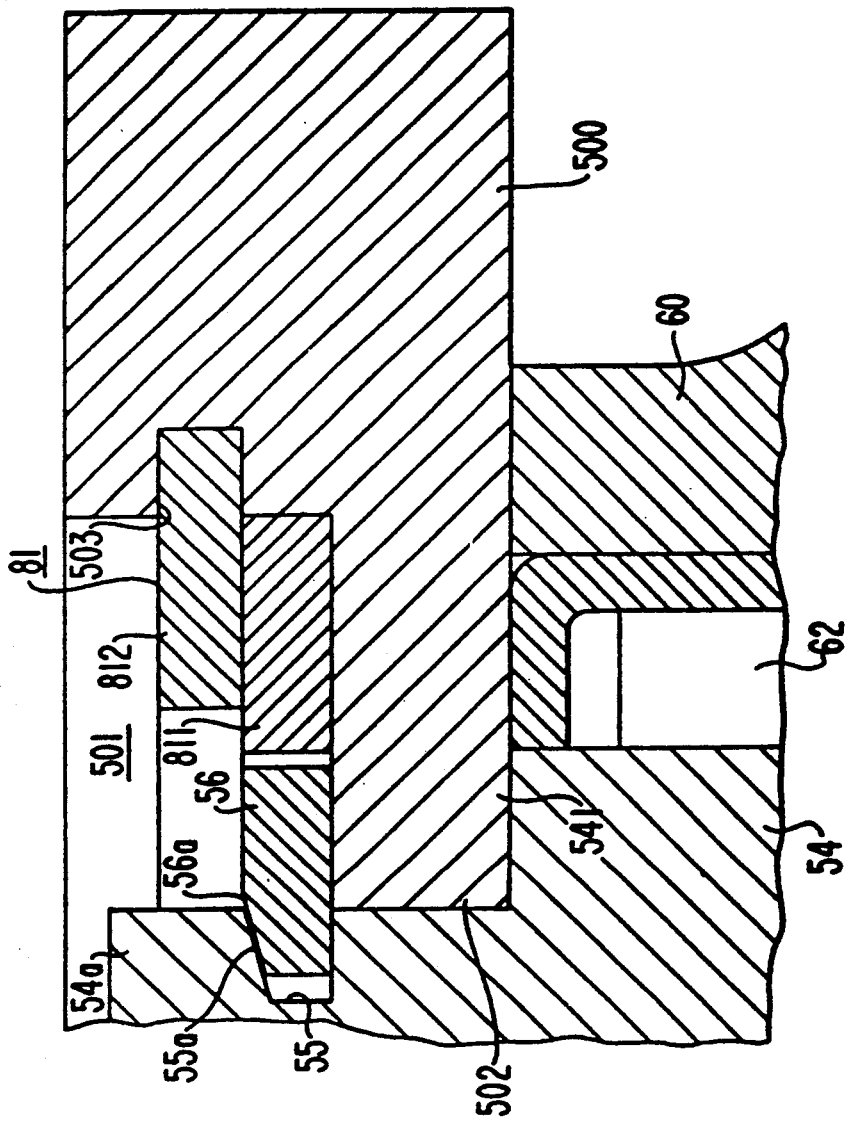
FIG. 4 shows an enlarged partial sectional view of the compressor shown in FIG. 3 including the balance weight ring and a retaining mechanism for preventing the ring from slipping off of the slant plate in accordance with a first embodiment of this invention.

With reference to FIGS. 3-4, the construction of slant plate type compressor 10 in accordance with a first embodiment of the present invention is shown. Compressor 10 includes cylindrical housing assembly 20 including cylinder block 21, front end plate 23 disposed at one end of cylinder block 21, crank chamber 22 formed between cylinder block 21 and front end plate 23, and rear end plate 24 disposed at the opposite end of cylinder block 21. Front end plate 23 is mounted on the open forward end of cylinder block 21 by a plurality of bolts 101 to enclose crank chamber 22 therein. Rear end plate 24 is mounted on cylinder block 21 at its opposite end by a plurality of bolts 102. Valve plate 25 is located between rear end plate 24 and cylinder block 21. Opening 231 is centrally formed in front end plate 23. Drive shaft 26 is supported by bearing 30 disposed in opening 231. Central bore 210 extends through cylinder block 21 to a rearward end surface. The inner (rear) end portion of drive shaft 26 is rotatably supported by bearing 31 disposed within central bore 210 of cylinder block 21. Valve control mechanism 19 is disposed in bore 210 to the rear of drive shaft 26.

Cam rotor 40 is fixed on drive shaft 26 by pin member 261, and rotates with shaft 26. Thrust needle bearing 32 is disposed between the axial inner (rear) end surface of front end plate 23 and the adjacent forward axial end surface of cam rotor 40. Cam rotor 40 includes arm 41 having pin member 42 extending therefrom. Slant plate 50 is disposed about drive shaft 26 and includes opening 53 through which drive shaft 26 passes. Slant plate 50 is disposed adjacent cam rotor 40. Slant plate 50 includes arm 51 having slot 52, and boss 54. Cam rotor 40 and slant plate 50 are connected by pin member 42, which is inserted in slot 52 to create a hinged joint. Pin member 42 is slidable within slot 52 to allow adjustment of the angular position of slant plate 50 with respect to the longitudinal axis of drive shaft 26.

Wobble plate 60 is mounted about boss 54 of slant plate 50 through bearings 61 and 62 so that slant plate 50 is rotatable with respect thereto. Rotational motion of slant plate 50 causes nutational motion of wobble plate 60. Fork shaped slider 63 is attached to the outer peripheral end of wobble plate 60 and is slidably mounted on sliding rail 64 held between front end plate 23 and cylinder block 21. Fork shaped slider 63 prevents rotation of wobble plate 60 and wobble plate 60 reciprocates along rail 64 when cam rotor 40 and slant plate 50 rotate. Cylinder block 21 includes a plurality of peripherally located cylinder chambers 70 in which pistons 71 reciprocate. Each piston 71 is connected to wobble plate 60 at a peripheral location by a corresponding connecting rod 72. Nutational motion of wobble plate 60 causes pistons 71 to reciprocate in cylinders 70 to compress refrigerant therein.

Rear end plate 24 includes peripherally located annular suction chamber 241 and centrally located discharge chamber 251. Valve plate 25 is located between cylinder block 21 and rear end plate 24 and includes a plurality of valved suction ports 242 linking suction chamber 241 with respective cylinders 70. Valve plate 25 also includes a plurality of valved discharge ports 252 linking discharge chamber 251 with respective cylinders 70. Suction ports 242 and discharge ports 252 are provided with suitable read valves as described in U.S. Pat. No. 4,011,029 to Shimizu.

Suction chamber 241 includes inlet portion 241a which is connected to an evaporator of the external cooling circuit (not shown). Discharge chamber 251 is provided with outlet portion 251a connected to a condenser of the cooling circuit (not shown). Gaskets 27 and 28 are located between cylinder block 21 and the inner surface of valve plate 25, and the outer surface of valve plate 25 and rear end plate 24, respectively, to seal the mating surfaces of cylinder block 21, valve plate 25 and rear end plate 24.

Communication path 600 links crank chamber 22 and suction chamber 241 and includes central bore 210 and passageway 150. Valve control mechanism 19 controls the opening and closing of communication path 600 in order to vary the capacity of the compressor, as disclosed in Japanese Patent Application Publication No. 01-142,276.

During operation of compressor 10, drive shaft 26 is rotated by the engine of the vehicle through electromagnetic clutch 300. Cam rotor 40 is rotated with drive shaft 26, rotating slant plate 50 as well, causing wobble plate 60 to nutate. Nutational motion of wobble plate 60 reciprocates pistons 71 in their respective cylinders 70. As pistons 71 are reciprocated, refrigerant gas which is introduced into suction chamber 241 through inlet portion 241a, flows into each cylinder 70 through suction ports 242 and is compressed therein. The compressed refrigerant gas is discharged into discharge chamber 251 from each cylinder 70 through discharge ports 252, and therefrom into the cooling circuit through outlet portion 251a.

The capacity of compressor 10 may be adjusted to maintain a constant pressure in suction chamber 241 in response to a change in the heat load of the evaporator, or a change in the rotating speed of the compressor. The capacity of the compressor is adjusted by changing the angle of the slant plate with respect to a plane perpendicular to the axis of the drive shaft. This angle is dependent upon the crank chamber pressure. An increase in crank chamber pressure decreases the slant angle of the slant plate and the wobble plate, decreasing the capacity of the compressor. A decrease in the crank chamber pressure increases the angle of the slant plate and the wobble plate and thus increases the capacity of the compressor. In the compressor shown in FIG. 3, variable capacity mechanism 19 acts in response to the crank chamber pressure, such that the acting point is modified according to the discharge pressure, to control the link between the crank and suction chambers, to adjust the crank chamber pressure and thereby change the slant angle of slant plate 50 and vary the operating capacity of the compressor. Of course other types of variable displacement mechanisms, or none at all may be used in compressors according to the present invention.

With reference to FIG. 4, compressor 10 further includes annular groove 55 formed in the radially outer surface of smaller diameter portion 54a of boss 54. Boss 54 includes annular shoulder 541 forward of smaller diameter portion 54a. Balance weight ring 500 includes annular depression 501 formed at a rearward, radially inner peripheral region, resulting in thin plate portion 502 formed axially forward of depression 501. Thin plate portion 502 fits on annular shoulder 541 of boss 54. Balance weight ring retaining mechanism 81 includes snap ring 56 disposed in groove 55 to the rear of portion 502. Ring 56 retains balance weight ring 500 on slant plate 50 by sandwiching portion 502 against shoulder 541. Mechanism 81 also includes annular member 811 disposed at an outer peripheral region of annular depression 501, surrounding snap ring 56. The width of annular member 811 is selected so as to limit the allowed radially outward expanding motion of snap ring 56, to ensure that snap ring 56 remains within groove 55 even when it is subjected to a radially expanding force which would tend to cause snap ring 56 to radially expand and slip out of groove 55. Annular groove 503 is formed in the radially outer surface of annular depression 501, axially rearward of thin plate portion 502. Snap ring 812 is disposed in groove 503, overlapping and in contact with ring member 811, and acts to retain ring member 811 in annular depression 501 of balance weight ring 500. Snap ring 56 is therefore retained in groove 55 by the provision of annular member 811 and snap ring 812, and prevents balance weight ring 500 from slipping off of slant plate 54.

When the compressor operates under unusual or extreme conditions, for example, when the rotational speed of the compressor is extremely high, or the rotational speed of the compressor is suddenly increased, or refrigerant in the liquid state is present in the compressor, balance weight ring 500 is securely retained on smaller diameter portion 54a of boss 54 due to retaining mechanism 81. Even if snap ring 56 expands in response to the unusual operating conditions, since the extent of expansion of snap ring 56 is limited, balance weight ring 500 is maintained on boss 54.

Figure 5:
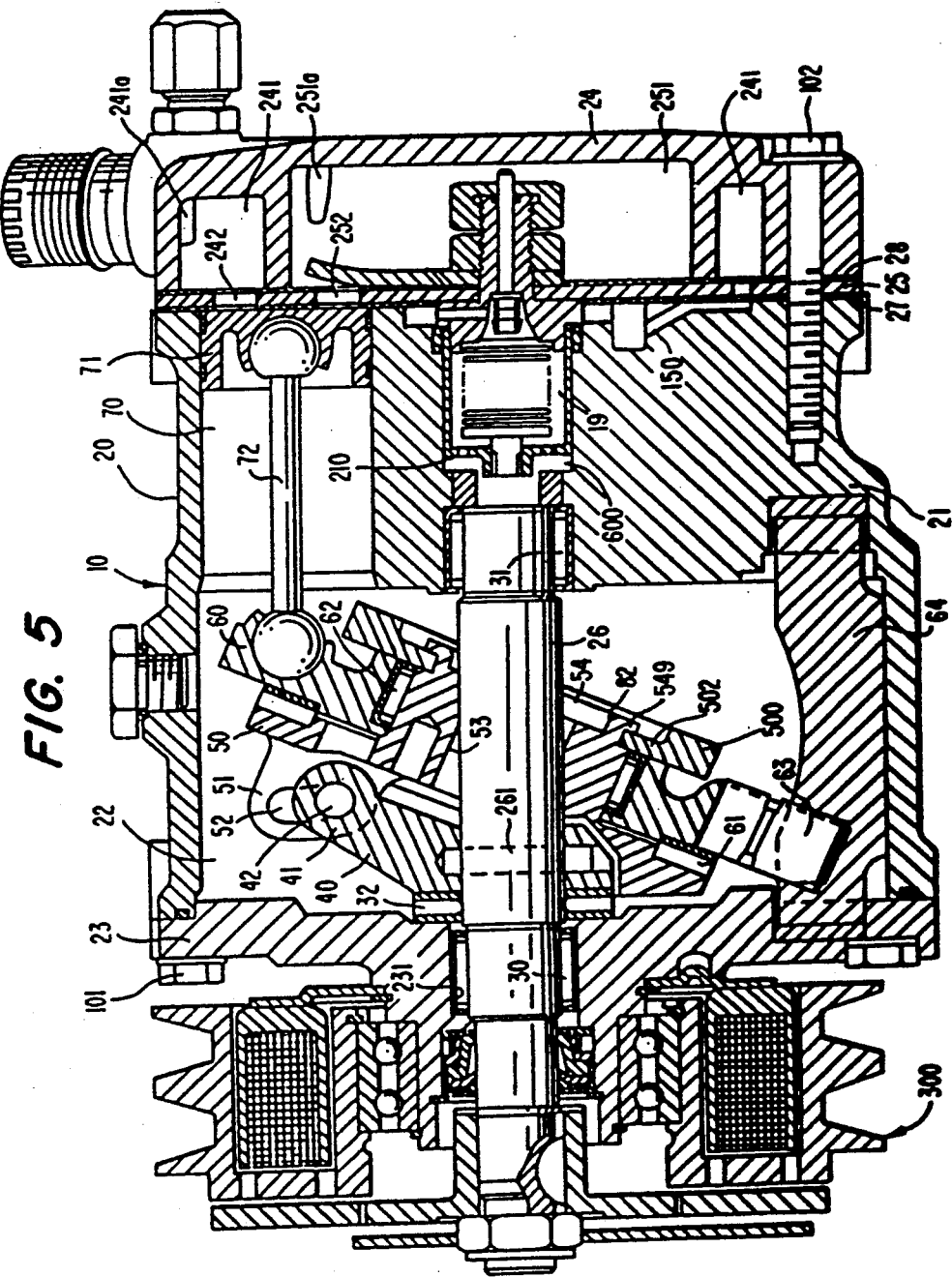
FIG. 5 shows a vertical longitudinal sectional view of a slant plate type refrigerant compressor in accordance with a second embodiment of the present invention.

With reference to FIGS. 5 and 6a-6b, a slant plate type compressor including a retaining mechanism in accordance with a second embodiment of the present invention is shown. Balance ring retaining mechanism 82 includes annular projection 549 integrally formed with and extending from boss 54 of slant plate 50. Shoulder 542 is formed on boss 54, around projection 549. Thin plate portion 502 of balance weight ring 500 is disposed on shoulder 542 of boss 54. Projection 549 is bent to extend around the radially inner periphery of annular thin plate portion 502 of balance weight ring 500, to secure balance weight ring 500 on boss 54.

With reference to FIGS. 6(a)-6(b), the formation of retaining mechanism 81 is shown. Boss 54 is formed such that annular projection 549 extends substantially axially from the rear surface, forming annular shoulder 542 exteriorly thereof. Annular projection 549 is relatively thin and is made of a soft metal, for example, untempered iron, such that it may be bent by a press work (not shown). The outer diameter of annular projection 549 is selected to be slightly smaller than the inner diameter of balance weight ring 500 such that thin plate portion 502 may be disposed on shoulder 542. After thin plate portion 502 is disposed on shoulder 542, annular projection 549 is bent radially outwardly by mold 100 of the press work so as to clamp thin plate portion 502 against shoulder 542. Since the need for a snap ring is eliminated, balance weight ring 500 is securely retained on slant plate 50, even when the compressor operates under unusual conditions.

With reference to FIGS. 7(a) and 7(b), a retaining mechanism according to a third embodiment of the invention is shown. Retaining mechanism 83 includes snap ring 56 disposed in groove 55 of boss 54 to retain balance weight ring 500 on slant plate 50 as shown in FIG. 4. Retaining mechanism 83 also includes annular member 831 made of soft metal, for example, untempered iron, and disposed around snap ring 56 on a radially outer portion of annular depression 501. Groove 504 is formed in the radially outer surface of annular depression 501 at the same axial location as annular member 831 and snap ring 56. Annular member 831 is caulked to the inner surface of groove 504 by application of annular caulking tool 200, which results in expansion of ring member 831 in both the radially inward and outward directions. Template 250 is disposed about caulking tool 200 to ensure that annular member 831 does not expand in the axial direction. As a result, the radially outer portion of annular member 831 is firmly secured within groove 504, and the radially inner surface of ring member 831 is adjacent the radially outer surface of snap ring 56, thereby limiting the allowed radially outward expansion of snap ring 56 when the compressor operates under unusual operating conditions. Therefore, snap ring 56 is securely retained in groove 55, and balance weight ring 500 is securely retained on boss 54 of slant plate 50.

With reference to FIGS. 8(a)-8(b) a retaining mechanism in accordance with a fourth embodiment of the present invention is shown. Retaining mechanism 84 includes balance weight ring 500' made of soft metal, for example, untempered iron, and configured similarly as shown in FIG. 2, including integral thin plate portion 502'. Ring-shaped sheet 841 is made of a hard metal, such as hardened iron, and is disposed forward of a radially inner, axial end surface of balance weight ring 500' at the location of thin plate portion 502'. Sheet 841 covers annular shoulder 541 of boss 54, bearing 62 and an axially rearward surface of wobble plate 60. Ring-shaped sheet 841 prevents friction between bearing 62 and balance weight ring 500', and between wobble plate 60 and balance weight ring 500', when balance weight ring 500' rotates during operation of the compressor.

Boss 54 includes smaller diameter region 54a having annular groove 55'. Thin plate portion 502' of balance weight ring 500' is caulked to boss 54 at annular groove 55' by application of caulking tool 200 and template 250 which causes the radially inner surface of thin plate portion 502' to expand radially into groove 55'. As a result, the radially inner portion of thin plate portion 502' is firmly secured within annular groove 55' to securely retain balance weight ring 500' on boss 54. Since the need for a snap ring has been eliminated, even when the compressor operates under unusual operating conditions, ring 500 remains on boss 54.

Figure 9A:
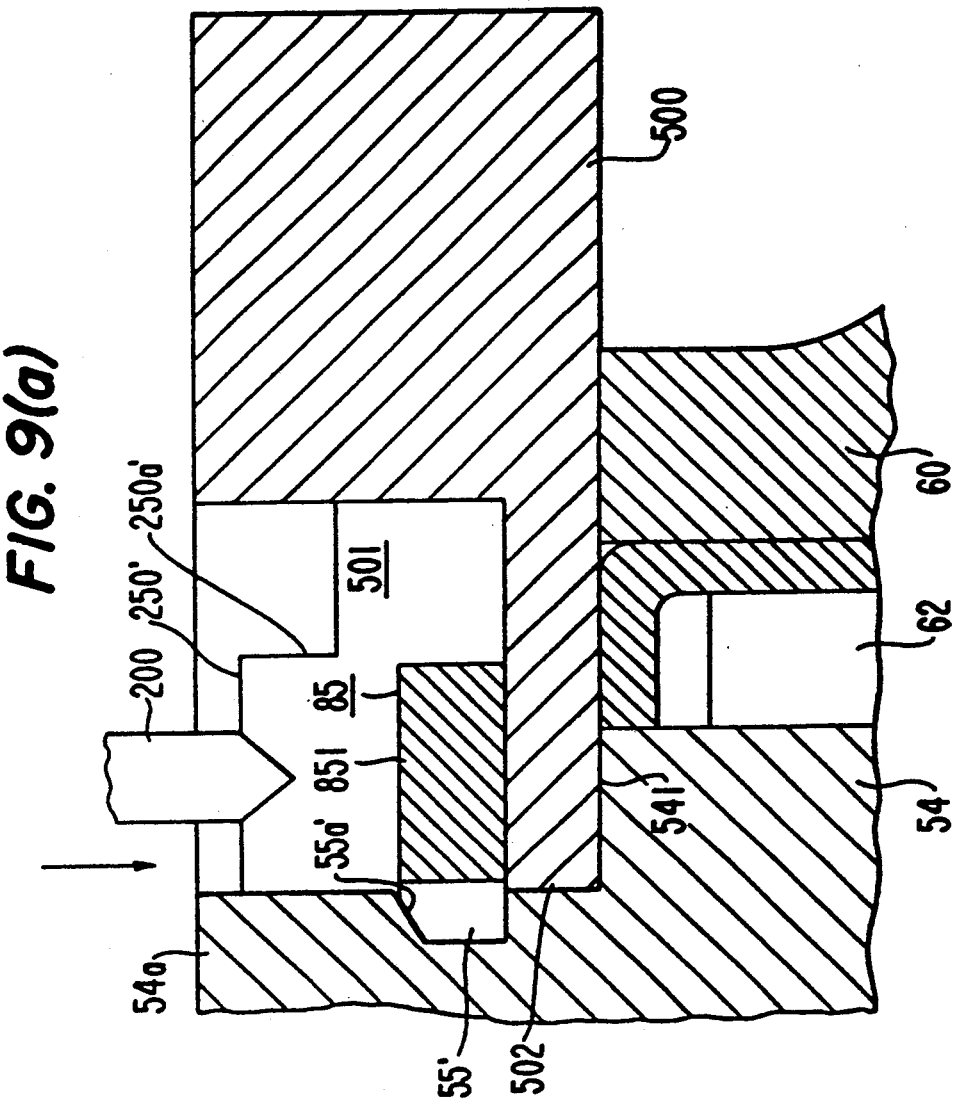

With reference to FIGS. 9(a)-9(b), a retaining mechanism in accordance with a fifth embodiment of the present invention is shown. Balance weight ring 500 includes thin plate portion 502. Annular groove 55' is peripherally formed in smaller diameter portion 54a and includes inwardly inclined wall 55a'. Retaining mechanism 85 includes annular member 851 made of soft metal, for example, untempered iron, disposed on thin plate portion 502 of balance weight ring 500. The radially inner diameter of annular member 851 is slightly greater than the outer diameter of smaller diameter portion 54a of boss 54. Annular member 851 is caulked to boss 54 at groove 55' by applying caulking tool 200 and template 250' including recessed region 250a', which causes annular member 851 to expand radially inwardly. A small gap may be provided in the radial direction between annular member 851 and region 250a' which would allow for minimal radially outward expansion. As a result, the radially inner portion of annular member 851 is firmly secured into annular groove 55' to securely retain balance weight ring 500 on boss 54. Since ring member 851 is caulked into groove 55', it is generally not subject to radial expansion under extreme operating conditions. Since the need for a snap ring is eliminated, balance weight 500 remains on boss 54, even when the compressor operates under unusual operating conditions.

In the embodiments shown in FIGS. 7-9, the caulking is performed completely around the inner periphery of the annular member or thin plate portion. However, the caulking may be performed only intermittently about the periphery, that is, the caulking may be accomplished at three or more locations about the periphery at equal angular intervals.

Figure 10:
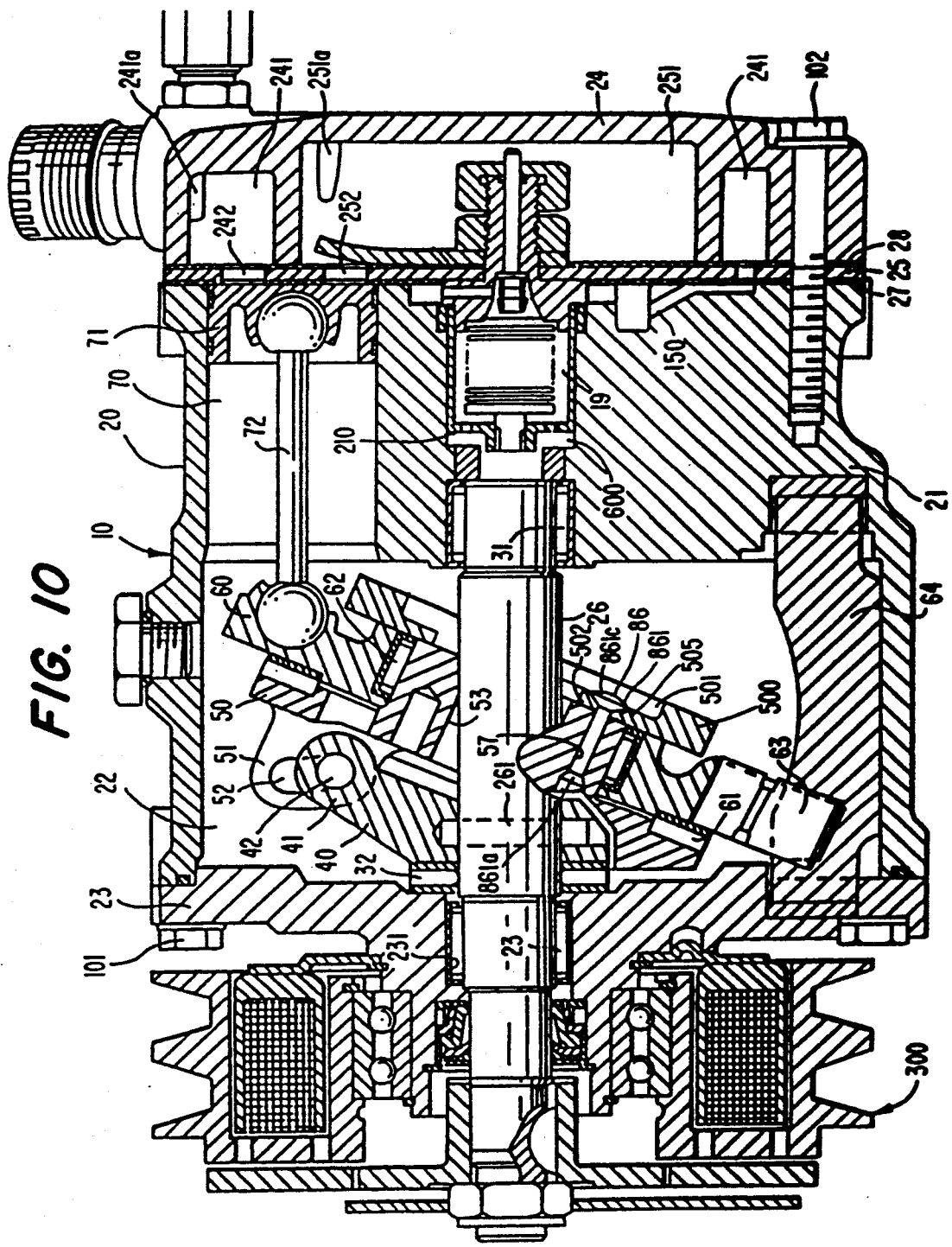
FIG. 10 shows a vertical longitudinal sectional view of a slant plate type refrigerant compressor in accordance with a sixth embodiment of the present invention.

FIG. 10 illustrates a slant plate type compressor including a retaining mechanism in accordance with a sixth embodiment of the present invention. Retaining mechanism 86 includes a plurality of holes 505 formed axially through thin plate portion 502 of balance weight ring 500. A plurality of holes 57 corresponding to holes 505 are formed axially through slant plate 50 at corresponding locations. Balance weight 500 is disposed on slant plate 50, and holes 57 are aligned with holes 505. Shaft portions 861a of a plurality of rivets 861 are inserted into each corresponding pair of hole 57 and hole 505 from the axially forward side of slant plate 50 until head 861b of each rivet 861 contacts the axially forward surface of slant plate 50. The opposite end 861c of each rivet 861 is expanded by a suitable method, for example, by disposing a template over ends 861c and hitting with a hammer, to firmly secure thin plate portion 502 of balance weight ring 500 to slant plate 50. Accordingly, since the need for a snap ring is eliminated, balance weight ring 500 is securely retained on slant plate 50 even when the compressor operates under unusual operating conditions.

This invention has been described in connection with the preferred embodiments. These embodiments, however, are merely for example only and the invention is not restricted thereto. It will be understood by those skilled in the art that other variations and modifications can be easily made within the scope of this invention as defined by the appended claims.

We claim:

1. In a slant plate type refrigerant compressor comprising a compressor housing including a cylinder block, said cylinder block including a plurality of peripherally disposed cylinders, a crank chamber enclosed within said cylinder block at a location forward of said cylinders, said compressor housing including a suction chamber and a discharge chamber formed therein, a piston slidably fitted within each of said cylinders, a drive mechanism coupled to said pistons to reciprocate said pistons within said cylinders, said drive mechanism including a drive shaft rotatably supported in said housing, said drive mechanism further including coupling means for coupling said drive shaft to said pistons such that rotary motion of said drive shaft is converted into reciprocating motion of said pistons in said cylinders, said coupling means including a slant plate disposed on said drive shaft and having a surface disposed at an inclined angle relative to said drive shaft, said slant plate having a boss, an annular balance weight disposed on said boss, the improvement comprising:

a retaining means for retaining said balance weight on said slant plate, said retaining means including an annular projection extending axially from said boss, a shoulder formed about said annular projection, said balance weight disposed on said shoulder about said annular projection a portion of said projection is bent radially outwardly around the radially inner peripheral region of said balance weight to secure said balance weight on said boss of said slant plate.

2. The compressor recited in claim 1, said annular projection comprising a soft metal.

3. The compressor recited in claim 1, said soft metal comprising untempered iron.

4. The compressor recited in claim 1, said coupling means further comprising a wobble plate disposed about said boss, said pistons linked to said wobble plate by connecting rods, said slant plate rotating with said drive shaft, rotational motion of said drive shaft and said slant plate causing said wobble plate to nutate and reciprocate said pistons in said cylinders.

5. The compressor recited in claim 1, said balance weight comprising a thin plate portion at the radially inner periphery, said annular projection disposed about said thin plate portion.

* * * * *